UNITED STATES PATENT OFFICE.

OMER MARCHAND, OF ST. PAUL L'ERMITE, QUEBEC, CANADA, ASSIGNOR OF ONE-THIRD TO ALEXANDRINE GLACKMEYER, OF NEW YORK, N. Y., ONE-SIXTH TO ALEXANDRE ARCHAMBAULT, ONE-TWELFTH TO JULIENNE LAFONTAINE DESCHAMP, AND ONE-TWELFTH TO LEDA LAFONTAINE ARCHAMBAULT, OF ST. PAUL L'ERMITE, CANADA.

PAINT.

956,390.  Specification of Letters Patent. Patented Apr. 26, 1910.

No Drawing.    Application filed July 20, 1908.  Serial No. 444,477.

To all whom it may concern:

Be it known that I, OMER MARCHAND, a subject of the King of England, and a resident of St. Paul l'Ermite, Province of Quebec, Dominion of Canada, have invented certain new and useful Improvements in Paints, of which the following is a full, clear, and exact description.

This invention relates more particularly to paints for metal surfaces.

The primary object of the invention is to provide a paint which will effectually prevent iron, steel or similar metals from rusting, and which is particularly adapted for painting bridges, steel buildings and similar structures.

A further object of the invention is to provide a paint which will be cheaper than those ordinarily used, and which will last much longer, and will dry much quicker than the ordinary paint.

With these and other objects in view, the invention will be hereinafter more particularly described, and will then be pointed out in the claims at the end of the description.

While I shall particularly specify certain elements as composing paint and certain methods whereby the paint may be made, it will be understood that I do not limit myself to the particular elements enumerated nor the exact proportions thereof, nor do I limit myself to the method described for making the paint.

To make a white paint I may take certain elements and combine them in the following proportions:—

| | |
|---|---|
| Muriatic acid (30 %) | 180 ozs. |
| Sulfate of zinc | 1¼ lbs. |
| Caustic potash | 10 ozs. |
| Carbonate of potash | 10 ozs. |
| Zinc in sheets | 60 ozs. |
| Aluminum (powdered) | 30 ozs. |
| White lead | 1,000 lbs. |
| Turpentine | 6 imperial gals. |
| Linseed oil | 50 " " |

These ingredients may be mixed in any suitable manner, and a good method is to dissolve the sulfate of zinc in a sufficient quantity of water, and the sheets of zinc separately dissolved in the muriatic acid. The carbonate of potash is dissolved in a proper quantity of water. The white lead has enough oil mixed therewith to make a soft paste, and all the ingredients except the white lead are then put into a proper quantity of oil and stirred, and when this preparation is perfectly mixed, the same is poured into the white lead, and the remainder of the oil is added, and after it is well stirred the powdered aluminum previously mixed in oil or turpentine is added and the paint is ready for use. If other colors are desired these may be secured by adding the color pigment wanted to this combination, or by substituting the same for a portion or all of the white lead. If desired it will be understood, of course, that in some instances either of the alkalies or zinc salts or the aluminum may be omitted and satisfactory results obtained.

Having thus described my invention, I claim as new and desire to secure by Letters Patent:—

1. A paint composed of a mixture of caustic potash, carbonate of potash, zinc sheets dissolved in muriatic acid, a pigment, and linseed oil.

2. A paint composed of a mixture of zinc dissolved in muriatic acid, sulfate of zinc, caustic potash, carbonate of potash, linseed oil, and a pigment.

3. A paint composed of a mixture of zinc dissolved in an acid, caustic potash, carbonate of potash, linseed oil, and a pigment.

4. A paint composed of a mixture of zinc dissolved in muriatic acid, sulfate of zinc, caustic potash, carbonate of potash, aluminum, white lead, turpentine, and linseed oil in substantially the proportions specified.

5. A paint composed of a mixture of zinc dissolved in an acid, sulfate of zinc, caustic potash, carbonate of potash, aluminum, and linseed oil.

6. A paint composed of a mixture of zinc dissolved in muriatic acid, aluminum, white lead, turpentine, and linseed oil.

This specification signed and witnessed this 25th day of June A. D. 1908.

OMER MARCHAND.

Witnesses:
P. A. SÉGUIN,
LUDGER PERREAULT.